UNITED STATES PATENT OFFICE.

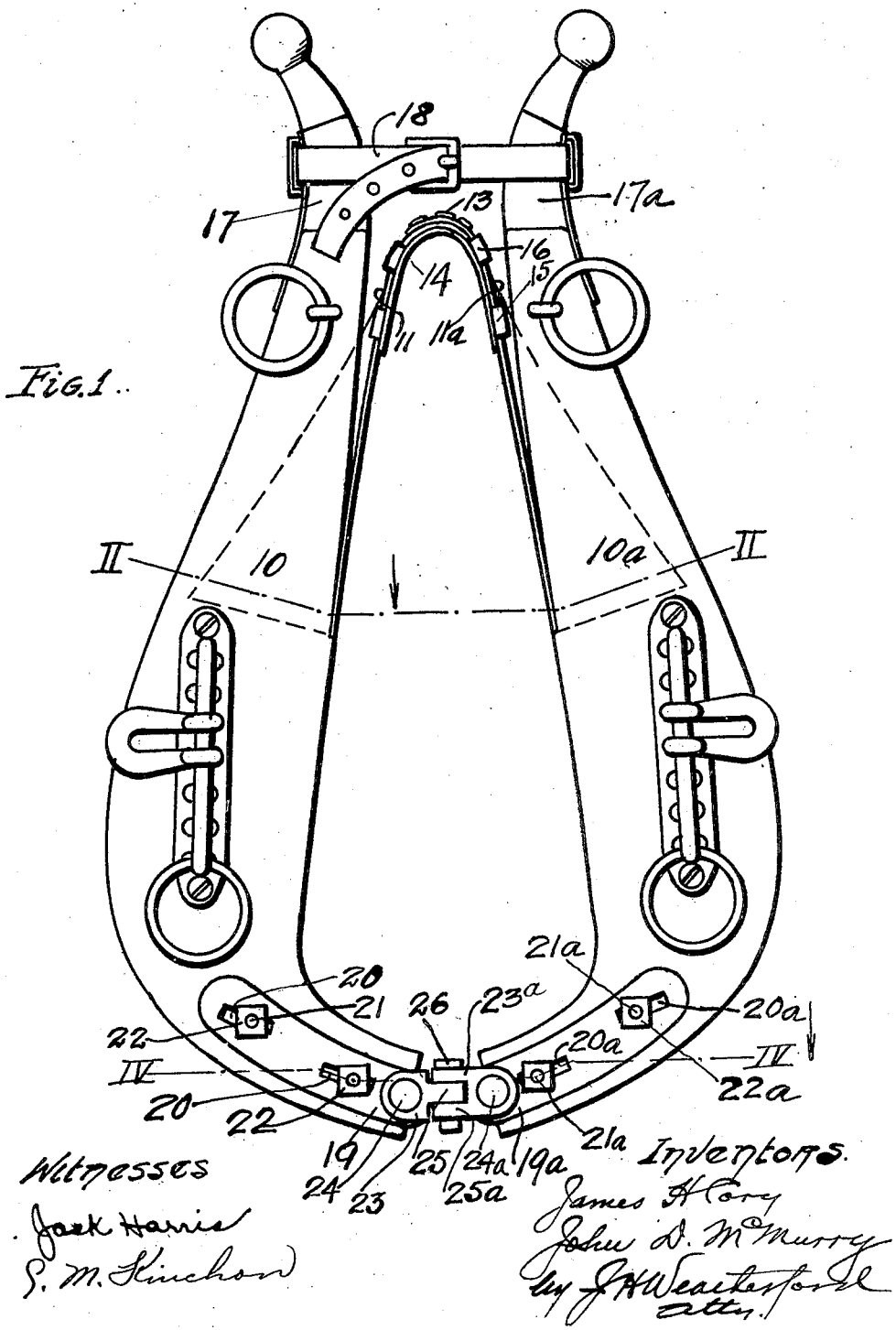

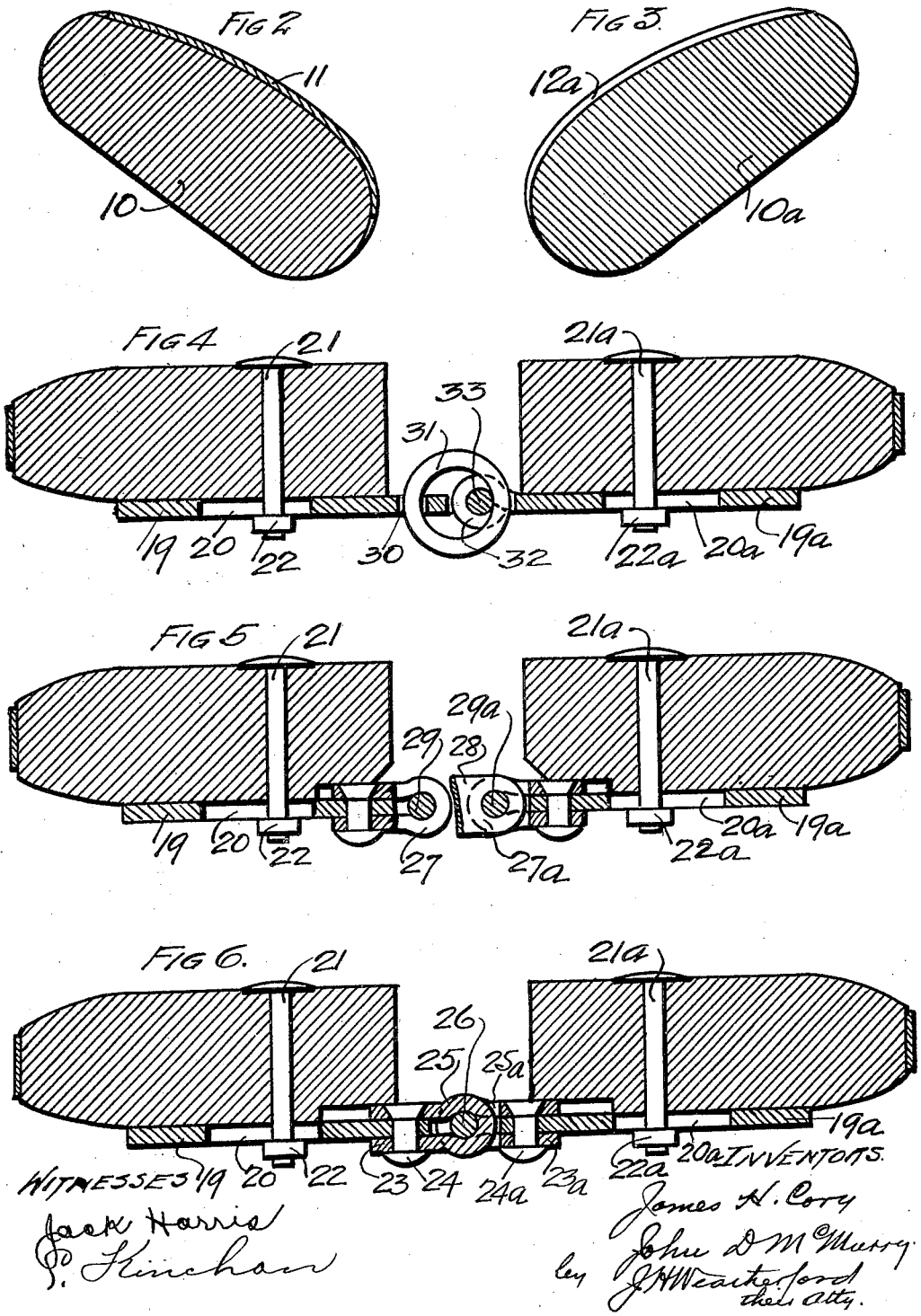

JAMES H. CARY AND JOHN D. McMURRY, OF MEMPHIS, TENNESSEE.

COMBINATION COLLAR AND HAME.

1,402,920.  Specification of Letters Patent.  Patented Jan. 10, 1922.

Application filed June 16, 1919. Serial No. 304,422.

*To all whom it may concern:*

Be it known that we, JAMES H. CARY and JOHN D. McMURRY, both citizens of the United States, residing in Memphis, county of Shelby, State of Tennessee, have invented certain and useful Improvements in a Combination Collar and Hame, of which the following is a full, clear, and exact description, such as will enable others skilled in the art to make and use the same.

Our invention relates especially to improvements in a joint collar and hame of rigid material, whereby the draft and pull on the collar and hame is successfully transferred to the shoulder of the mule or horse on which the article is used. It further relates to improvement whereby motion of the two sides of the collar and hame is permitted to allow it to adjust itself to the movement of the shoulders of the animal on which it is used and in the method of supporting the collar independently of the upper draft straps.

The objects of our invention are to accomplish these purposes in a simple, expeditious, and reliable manner. We accomplish these objects as will be more fully hereinafter set forth in the drawings, specifications, and claims.

In the drawings:

Figure 1, is front elevation of our improved collar and hame in its preferred form.

Figure 2, is a sectional plan view on an enlarged scale, of one-half of our collar and hame, on the line II—II, Figure 1, showing the supporting strap attached.

Figure 3, is a similar sectional plan view of the opposite half on the same line showing same before the attachment of the supporting straps.

Figure 4, is a section on the line IV—IV, Figure 1, on an enlarged scale, showing one form of fastening at the bottom.

Figure 5, is a similar section on the same line, showing a modified form of bottom fastening, and, Figure 6, is a similar section on the same line, showing the preferred form of bottom fastening.

Referring now to the drawings in which various parts are indicated by numerals, each numeral indicating the same part in all the views, the collar consists primarily of two similar halves 10, 10ª, preferably made of wood, or if not of wood, of fiber, hard paper, or metal, it being essential, however, that they be of some rigid, non-flexible material. These halves are especially shaped to fit the curve of the animal's neck, for the lower one-half of their height, and from such point are cut away, or bear away, so as to diverge from the curve of the animal's neck, and to thereby relieve any side pressure thereon from the rigid portion of the collar. At this point the collar may be said to end, and at this point a single flexible band or strap 11, is attached to the half 10, and a similar band 11ª is attached to the half 10ª, these two bands being so attached to the inner surface of the respective halves as to form at that point a continuation of the formed inner surface below the point of attachment. We have shown this point of attachment about midway from the top to the bottom of the collar, but it is distinctly understood that this point of attachment may be varied slightly therefrom. The halves are preferably cut back as shown at 12ª, in Figure 3, to form a recess. The corresponding band 11, is shown in place in Figure 2, in the corresponding recess in the half 10. It will be seen from an inspection of Figure 2, that this band 11, is of such width as to cover practically the entire bearing surface of the collar where it comes against the animal's shoulder. The free end of these bands 11, 11ª, may be lapped and fastened by a lace 13, or by some other suitable type of fastening.

14 is a pad of thin leather or cloth, which may be used inside of the bands 11, 11ª, or omitted as may be desired. If used, this pad may be held in place by loops, or straps 15, 16. It is essential, however, that the upper part of the two halves 10, 10ª, shall bear away from these bands 11, 11ª, respectively, so that the latter may form a truly flexible support, which shall be independent in action from the lower or true collar part at all points above the point of attachment.

17, 17ª, are horns which extend above the upper end of the halves 10, 10ª, respectively, and which take the place of the ordinary hame and are held together for draft purposes by some form of draft fastenings, such as the strap 18.

The bottom ends of the two halves, are joined together by a fastener, which permits movement of the halves, relative to each other, yet holds them apart, and fastens them together. As a means of accomplishing this fastening, I show three forms of fastenings in the sectional plans, Figures 4, 5, 6. In order to fit the collar to the animal's neck, these fastenings are made adjustable on the lower end of the collar halves. For this purpose I use two plates 19, 19a, shown most clearly in Figure 1, having slots 20, 20a, respectively, and fastened to their respective collar halves by means of bolts 21, 21a, preferably extending through the said halves, and having nuts 22, 22a, which may be loosened to provide for adjustment, and then tightened to clamp the said plates 19, 19a, rigidly in place against their respective halves. In Figures 1 and 6, the end of the plate 19 is embraced by a flat metal strap 23, bent to form a U, which strap is pivoted to the strap 19 by a rivet 24, or if desired by a bolt serving the same purpose. The loop of the U is reduced in width to form a tongue 25, and enlarged in diameter to permit the insertion of a pin 26. A complementary U shaped strap 23a, embraces and is pivoted to the plate 19a, by a similar rivet 24a. The loop of this U, 25a, is however slotted to embrace the tongue 25, and is enlarged to embrace the pin 26, the two U straps forming, with the pin 26, a hinge, and the entire combination forming a fastening with a universal movement. The pin 26, is removable, so that it may be removed to allow the collar to be put on or taken off the animal. With this form of fastening, the halves move up and down, relative to each other, and in addition, forward and backward on a hinge so that the forward movement of either shoulder rotates the corresponding half of the collar, without disturbing the position of the other half of the collar on the opposite shoulder.

In Figure 5, the two U straps 27, 27a are identical with the U strap 25a, and are similarly pivoted to the straps 19, 19a, by rivets 24, 24a, they are, however, spread apart and connected by a link 28, with pins 29, 29a, through the link and the loops of the U's. One-half of the link 28, is broken away to show the U more clearly. In this form of fastening, the movement is not only a hinge movement, but each half of the collar can also move forward and backward practically parallel to the other half, and the up and down motion also be retained.

In Figure 4, I show a third form of fastening. In this form, the plate 19, is extended beyond the collar half 10, and a hole 30, formed therein. Through this hole is a ring, which may be some form of cold shut ring, or which may be welded in place, or a slot may be cut through one side of the plate 19, into the hole 30, the ring slipped in, and the slot closed. On the opposite side the ring is preferably fastened in a U end, identical with the U end 25a, of Figure 6, except that it is formed on the end of the plate 19a. The ring is held by a pin 33. In this form of fastening, the movement would also be a hinge movement, a parallel, and an up and down movement as in the preceding case. It will be especially noted that the pin 33, and either the pin 29 or the pin 29a are removable pins, which are taken out to allow the collar halves to be separated and placed on the animal's neck, and that when replaced, after the collar is put on the animal, they fasten the halves together.

It will be distinctly understood that while we have shown the point of attachment of the straps 11, 11a, at the middle point of the collar halves, it may be raised, to say approximately one-third the distance from the top, without departing from the spirit of our invention. It will also be understood that equivalent forms of fastenings for the lower end of the collar may be used so long as they may be adjusted to give different widths for different sizes of neck, yet hold the halves apart and fasten them together while permitting relative movement of the same.

Having fully described our invention, what we claim and desire to secure by letters patent in the United States, is:—

1. In a combination collar and hame, two oppositely disposed formed halves of rigid material, having top and bottom draft fastenings, a support comprising two single flexible bands, one attached to each of the said halves about midway from the top to the bottom of the said halves, each of the said bands being of substantially the width of the collar at the point of attachment, and being so attached as to form a continuation of the inner surface of the collar below the line of attachment of the said bands, and means of joining the said bands to form a flexible support for the said rigid halves.

2. In a combination collar and hame, two oppositely disposed halves of rigid material having the lower one-half of each shaped to conform to an animal's shoulder, and the upper one-half bearing away from the shoulder, top and bottom draft fastenings for the said halves, a support comprising two single flexible bands of substantial width, one attached to each of the said halves midway between the top and bottom of the same, and being so attached as to form a continuation of the inner surface of the lower portion of the said halves and means of joining the said bands to form a flexible support for the said rigid halves.

3. In a combination collar and hame, two oppositely disposed halves of rigid material having the lower one-half of each shaped to conform to an animal shoulder and the upper one-half bearing away from the shoulder, a recess cut in the inner face of each half at the mid point, a support comprising two single flexible bands of substantial width, one attached to each of the said halves in the recess formed at the mid point, so that its inner surface forms a continuation of the inner surface of the lower portion of the said halves, means for joining the said bands at the top, and suitable top and bottom draft fastenings for the said halves.

In testimony whereof we have hereunto set our names.

JAMES H. CARY.
JOHN D. McMURRY.

Witnesses:
 JACK HARRIS,
 CLARICE N. KINCHON.